United States Patent Office 3,575,926
Patented Apr. 20, 1971

3,575,926
PROCESS FOR CURING POLYEPOXIDES WITH AN ALIPHATIC POLYAMINE IN THE PRESENCE OF A N - (AMINOALKYL)PIPERAZINE DICYANDIAMIDE AND AN IMIDAZOLE
James Donald Joyce, North Plainfield, and Lawrence Charles Reilly, Clark, N.J., assignors to Shell Oil Company, New York, N.Y.
No Drawing. Filed Oct. 14, 1968, Ser. No. 768,615
Int. Cl. C08g 30/14
U.S. Cl. 260—47          9 Claims

ABSTRACT OF THE DISCLOSURE

A process for room temperature curing polyepoxides, such as glycidyl polyethers of polyhydric phenols is disclosed. This process comprises mixing and reacting a polyepoxide with an aliphatic polyamine in the presence of an N-(amino alkyl)piperazine, dicyandiamide and an imidazole. Use of the process for preparing adhesive compositions is also disclosed.

DESCRIPTION OF THE INVENTION

This invention relates to a process for curing polyepoxides at room temperatures. More particularly, the invention relates to a process for curing polyepoxides with an aliphatic polyamine in combination with special accelerators and to the resulting cured products.

Specifically, the invention provides a new process for curing and resinifying a polyepoxide having more than one vic-epoxy group, and preferably a glycidyl polyether of a polyhydric phenol, with an aliphatic polyamine possessing a plurality of amino hydrogens, in the presence of an N-(amino alkyl)piperazine, dicyandiamide and an imidazole compound. The invention further provides cured products obtained by the above-described process.

As a special embodiment, the invention further provides a process for utilizing the above-described new catalyst system in the preparation of fast curing room temperature adhesives, particularly for the bonding of metal-to-metal, glass-to-glass, metal-to-glass, and the like.

It is known that polyepoxides can be converted to insoluble infusible products by reaction with a polyamine in the presence of a phenol. This type of curing system, however, is not particularly suited for certain applications, such as in the preparation of quick setting room temperature adhesives, where the composition must set up in a matter of minutes. For example, such an adhesive is needed in outdoor bonding applications where the temperature might be as low as 0° C. In these applications, the adhesive must form a strong bond which must cure within a matter of minutes. Known curing systems suitable for this application are unable to effect the necessary cure within the desired short period of time at temperatures equal to or below room temperature.

It is, therefore, an object of the invention to provide a new process for curing polyepoxides. It is a further object to provide a process for curing polyepoxides at room temperature or lower, which takes place at a rapid rate. It is a further object to provide new accelerators for polyamine cures of epoxy resins. It is a further object to provide a new process for curing polyepoxides at a rapid rate at room temperatures. It is a further object to provide new curing agent systems comprising a stable homogeneous blend of an aliphatic polyamine, an N-(amino alkyl)-piperazine, and an imidazole. It is a further object to provide new quick-setting room temperature adhesives for bonding metals, glass and the like. These and other objects of the invention will be apparent from the following detailed description thereof.

It has now been discovered that these and other objects may be accomplished by the process of the invention comprising mixing and reacting a polyepoxide having more than one vic-epoxy group, with an aliphatic polyamine possessing a plurality of amino hydrogens, such as diethylenetriamine, in the presence of (a) an N-(amino alkyl) piperazine, (b) dicyandiamide, and (c) an imidazole compound. It has been surprisingly found that this special curing agent combination brings about a very rapid cure of epoxy resins at room temperatures to form the desired insoluble infusible product. Adhesives containing this curing agent combination are, for example, able to be cured at room temperature in from about ⅓ to ½ the time normally required for the polyamine phenol cures. Such rapid rates make the composition ideal for use as quick-setting adhesives for outdoor bonding application with temperatures as low as about 0° C.

The polyepoxides to be used by the new process of the invention comprise those materials possessing more than one and preferably at least two vicinal epoxy groups, i.e.,

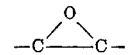

groups. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

Various examples of polyepoxides that may be used in the process of the invention are given in U.S. 2,633,458 and it is to be understood that so much of the disclosure of that patent relative to examples of polyepoxides is incorporated by reference into this application.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl)adipate,
di(2,3-epoxybutyl)oxalate,
di(2,3-epoxyhexyl)succinate,
di(3,4-epoxybutyl)maleate,
di(2,3-epoxyoctyl)pimelate,
di(2,3-epoxybutyl)phthalate,
di(2,3-epoxyoctyl)tetrahydrophthalate,
di(4,5-epoxydodecyl)maleate,
di(2,3-epoxybutyl)terephthalate,
di(2,3-epoxypentyl)thiodipropionate,
di(5,6-epoxytetradecyl)diphenyldicarboxylate,
di(3,4-epoxyheptyl)sulfonyldibutyrate,
tri(2,3-epoxybutyl)-1,2,4-butanetricarboxylate,
di(5,6-epoxypentadecyl)tartarate,
di(4,5-epoxytetradecyl)maleate,
di(2,3-epoxybutyl)azelate,
di(3,4-epoxybutyl)citrate,
di(5,6-epoxyoctyl)cyclohexane-1,2,-dicarboxylate,
di(4,5-epoxyoctadecyl)malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxyhexyl 3,4-epoxypentanoate, 3,4-epoxycyclohexyl 3,4-epoxycyclohexanoate, 3,4 - epoxycyclohexyl 4,5 - epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dibutyl 7,8,11,12-diepoxyoctadecanedioate, dioctyl 10,11-diethyl-8,9,12,13-diepoxyeicosanedioate, dihexyl 6,7,10,11-diepoxyhexadecanedioate, didecyl 9-epoxyethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane - 1,2 - dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eiconsanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers, butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type.

The aliphatic polyamines to be used in the curing agent combination include those organic materials possessing a plurality of amino hydrogens, i.e., a plurality of $$-\underset{|}{\overset{H}{N}}-$$

groups wherein N is an amino nitrogen.

Examples of these materials include, among others, ethylenediamine, diethylenetriamine, triethylenetetramine, tetraethylenepentamine, 1,4-aminobutane, 1,3-diaminobutane, hexamethylenediamine, 3-(N-isopropylamino)propylamine, N,N'-diethyl-1,3-propanediamine, hexapropyleneheptamine, penta(1 - methyl-propylene)hexamine, tetrabutylenepentamine, hexa - (1,1 - dimethylethylene) heptamine, di(1-methylbutylene)triamine, pentaamylhexamine, tri(1,2,2-trimethylethylene)tetramine, tetra(1,3-dimethylpropylene)pentamine, penta(1,5 - dimethylamylene)hexamine, penta(1,2 - dimethyl-1-isopropylethylene) hexamine and N,N'-dibutyl-1,6-hexanediamine.

Aliphatic polyamines coming under special consideration are the alkylene polyamines of the formula $$N_2H(RNH)_nH$$

wherein R is an alkylene radical, or a hydrocarbon-substituted alkylene radical, and $n$ is an integer of at least one.

Especially preferred aliphatic polyamines comprise the polyethylene polyamines of the formula

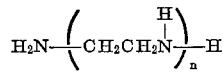

wherein $n$ is an integer varying from 2 to 8. Coming under special consideration are the polyethylene polyamines comprising 20–80% by weight of polyethylene polyamines having average molecular weights in the range of 200–500. These high molecular weight polyethylene polyamines normally start with tetraethylene pentamine, and further contain related higher polymers which increase in complexity with increasing molecular weights. The remaining 80–20% of the mixture is diethylene triamine employed in such proportions that the mixture is fluid at about room temperature (60–90° F.).

The mixture of high molecular weight polyethylene polyamines is normally obtained as a bottom product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% diethylene triamine has the following analysis:

|  | Percent by wt. |
|---|---|
| Carbon | 51.5 |
| Nitrogen | 34.3 |
| Hydrogen | 11.6 |
| Oxygen | 2.5 | total basicity, equivalents per 100 grams=1.98, equivalent to 27.7% nitrogen.

Active nitrogen—81%
Viscosity—75–250 poises
Equivalent weight—42.5 to 47.5%

The N-(aminoalkyl)piperazines to be used in the curing agent combination include, among others, N-aminobutylpiperazine, N - aminoisopropyl-3-butoxypiperazine, N-aminoethylpiperazine, 2,5 - dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

The imidazole compounds to be used in the curing agent combination include those of the formulae

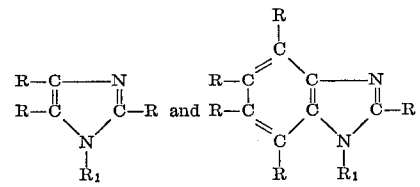

wherein R is hydrogen, halogen or an organic radical and $R_1$ is H or an organic radical, such as a hydrocarbon radical or a substituted hydrocarbon radical, for example, an ester, ether, amide, amino, halogen or mercapto-substituted hydrocarbon radical. Especially preferred are the imidazoles wherein R is hydrogen or a hydrocarbon radical, and preferably an alkyl, alkenyl, cycloalkyl, cycloalkenyl, aryl, alkaryl, or arylalkyl radical, and particularly those containing no more than 15 carbon atoms. Examples of such compounds include, among others, imidazole, 2-ethyl-4-methyl imidazole, 2,4-dioctyl imidazole, N-ethyl imidazole, N-butyl-2-ethyl imidazole, 2-cyclohexyl-4-methyl imidazole, 2-butoxy-4-allyl imidazole, 2-carboethoxybutyl-4-methyl imidazole, 2,4-dichlorobutyl imidazole, 2-octyl-4-hexyl imidazole, and 2-ethyl-4-phenyl imidazole, benzimidazole, methyl benzimidazole, dimethyl benzimidazole, chloro benzimidazole, mercapto benzimidazole, methoxy benzimidazole, and mixtures thereof. Other examples include the salts of the above-noted imidazole compounds such as their monocarboxylic acid salts, for example, their acetate, benzoate, formate, phosphate, and lactate salts, and their polycarboxylic acid salts, for example, their tartrate salts.

The amount of the curing agent combination to be used may vary over a wide range depending on the polyepoxide selected, type of application, etc. In general, amounts of the combination can vary from about 1 part to about 45 parts per hundred parts of polyepoxide. Preferred amounts vary from about 10 parts to about 30 parts per 100 parts of polyepoxide.

The amounts of the individual compounds in the curing agent combination may also vary within wide limits. In general, the amount of the aliphatic polyamine can vary from about 25–40 percent by weight calculated on the total weight of the curing agent combination. The amounts of the other three compounds generally varies as follows:

| Ingredient | Percent by wt. |
|---|---|
| N-(aminoalkyl)piperazine | 20–30 |
| Dicyandiamine | 10–20 |
| Imidazole compound | 25–35 |

In operating the process of the invention, one merely mixes the polyepoxide and the curing agent combination together in the above-noted proportions and utilizes the resulting mixture in the desired application. The order of mixing may be varied as desired. It is sometimes preferred to mix the aliphatic polyamine, the imidazole compound and the N-(aminoalkyl)piperazine together to form a stable curing agent combination and then as desired combining this mixture with the polyepoxide and the dicyandiamide.

The mixture of polyepoxide and curing agent combination is preferably employed in a mobile, spreadable condition. If the component or components are solids or very thick liquids, this may be accomplished by use of organic diluents or solvents. Various solvents or diluents may be employed. These may be volatile diluents which escape from the polyepoxide compositions by evaporation before or during the cure such as esters as ethyl acetate, butyl acetate, Cellosolve acetate (acetate of ethylene glycol monoethyl ether), methyl Cellosolve acetate (acetate of ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active diluents may be used in admixture with aromatic hydrocarbons such as benzene, toluene, xylene, etc., and/or alcohols such as ethyl, isopropyl, or n-butyl alcohol. Diluents which remain in the cured compositions may also be used, such as butylglycidyl ether, phenylglycidyl ether, diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of polyhydric phenols in admixture with a normally liquid glycidyl polyether of a polyhydric alcohol. In fact, two or more of any of the polyepoxides may be used together as mixtures.

Other types of materials may also be included in the composition, such as filters, as aluminum powder, asbestos, powdered mica, zinc dust, Bentonite, ground glass fibers, Moneeta clay and the like, stabilizers, plasticizers, insecticides, fungicides, extenders, such as alkylated phenols as dinonyl phenol, coal tars, asphalts, road oils, extracts and distillates, middle oil, refined coal tar, pine tars, and the like, as well as other types of resins as phenol-aldehyde resins, phenol-urea resins, polythiopolymercaptans, vinyl resins, polyolefins, synthetic rubbers, and the like, and mixtures thereof, and solid particles, such as particles of nylons, rayons, Dacrons, and the like. These and other materials are preferably employed in amounts less than 60% by weight of the polyepoxide, and more preferably not more than 50% by weight of the polyepoxide.

As noted, the process of the invention is particularly suited for use as quick-setting adhesives for bonding various types of materials together in a short period at ambient temperature or lower. The compositions may be used for bonding materials, such as glass-to-glass, metal-to-metal, glass-to-metal, wood-to-wood, and the like. They are particularly valuable as adhesives for bonding metal-to-metal or glass-to-glass.

To illustrate the manner in which the present invention may be carried out, the following examples are given. The examples are given only to illustrate the invention and are not to be regarded as limiting the scope of the invention in any way. Unless otherwise indicated, parts and percentages disclosed in the examples are by weight.

EXAMPLE I

This example shows the improved early bond strength of an adhesive based on the present curing agent combination as compared with the bond strength of an adhesive which contains a conventional phenol-accelerated amine curing agent.

The resin base used in the adhesive formulations contained the following ingredients.

| Ingredient: | Parts by wt. |
|---|---|
| Diglycidyl ether of bisphenol A (eq./100 g.=0.52) | 100 |
| Asbestos fibers | 15 |
| Clay | 24 |
| Silicon dioxide powder | 3 |

The curing agent combination according to the present invention contained the following ingredients.

| Ingredient: | Parts by wt. |
|---|---|
| Diethylene triamine (DTA) | 31.6 |
| Dicyandiamide | 14.5 |
| N-(aminoethyl)piperazine | 25.9 |
| Imidazole | 28.0 |

The bond strength was measured between aluminum panels according to test method ASTM D1002–64. The results are shown in the following table.

TABLE I

| Time, hours | Resin base plus 28 phr. curing agent comb., p.s.i. | Resin base plus 14 phr. DTA plus 5 phr. phenol, p.s.i. |
|---|---|---|
| Temperature,° C.: | | |
| 23 ... 1 | 400 | 0 |
| 23 ... 3 | 1,200 | 850 |
| 23 ... 7 | 1,800 | 1,700 |

EXAMPLE II

Example I was repeated with the exception that the 100 parts diglycidyl ether of bisphenol A in the resin base were replaced by 89 parts diglycidyl ether of bisphenol A (eq./100 g.=0.52) and 11 parts butylglycidyl ether. The results are listed in the following table.

TABLE II

| Time, days | Resin base plus 35 phr. curing agent comb., p.s.i. | Resin base plus 14 phr. DTA plus 5 phr. phenol, p.s.i. |
|---|---|---|
| Temperature,° C.: | | |
| 0 ... 1 | 900 | 0 |
| 0 ... 2 | 1,400 | ... |
| 0 ... 7 | 1,700 | 900 |
| 0 ... 28 | 2,300 | 800 |

EXAMPLE III

A mixture of 90 parts of diglycidylether of bisphenol A (eq./100 g.=0.52) with 10 parts of xylene was divided into two equal portions. The first portion was cured at 23° C. with 28 parts of the curing agent combination according to Example I. The second portion was cured at 23° C. with a conventional curing agent containing 14 parts DTA and 5 parts phenol. Tensile shear strength measurements on etched aluminum sheet gave the following results at 23° C. after 3 hours. First portion—1400 p.s.i.; second portion—550 p.s.i.

EXAMPLE IV

This example illustrates the superior performance of the novel curing agent combination over systems which contain only part of the ingredients of the combination. The following table shows that the novel curing agent combination has a much faster rate of conversion of epoxide than systems without either the imidazole or the dicyandiamide component.

The resin used was the diglycidyl ether of bisphenol A (eq./100 g.=0.52).

The curing agents used were composed as follows:

| Ingredient | Curing agent | | |
|---|---|---|---|
| | A | B | C |
| DTA | 31.6 | 31.6 | 31.6 |
| Dicyandiamide | 14.5 | | 14.5 |
| N-(aminoethyl)piperazine | 25.9 | 25.9 | 25.9 |
| Imidazole | 28.0 | 28.0 | |

TABLE III

| Temp., °C. | Time, hours | Percent | | |
|---|---|---|---|---|
| | | Resin plus 28 phr. curing agent A | Resin plus 24 phr. curing agent B | Resin plus 20 phr. curing agent C |
| 23 | ½ | [1] 53 | 26 | 29 |
| 23 | 1 | 70 | 45 | 46 |
| 23 | 2 | 76 | 66 | 51 |

[1] Percentage of epoxide converted, as measured by IR spectroscopy.

This table shows that the rate of conversion of epoxide in the system containing the novel curing agent combination, is significantly faster than that in the two other systems.

We claim as our invention:

1. A process for preparing a resinified product which comprises mixing and reacting at temperatures up to about room temperature a polyepoxide having more than one vic-epoxy group with a curing amount of a curing agent blend comprising (a) 25-40% by weight of an aliphatic polyamine possessing a plurality of amino hydrogens, (b) 20-30% by weight of an N-(aminoalkyl)-piperazine, (c) 10-20% by weight of dicyandiamide and (d) 25-35% by weight of an imidazole compound of the formula

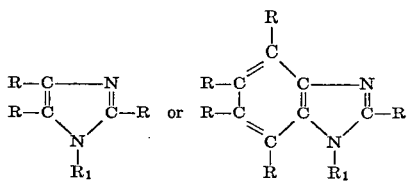

wherein R is hydrogen, halogen or a hydrocarbon radical, and $R_1$ is hydrogen or a hydrocarbon radical, said percent by weight being calculated on the total weight of said curing agent.

2. A process as in claim 1 wherein the polyepoxide is a glycidyl polyether of a polyhydric phenol.

3. A process as in claim 2 wherein the polyepoxide is a glycidyl polyether of 2,2-bis(4-hydroxyphenyl)propane.

4. A process as in claim 1 wherein the aliphatic polyamine is an alkylene polyamine of the formula $$NH_2(RNH)_nH$$

wherein R is an alkylene radical or a hydrocarbon-substituted alkylene radical, and $n$ is an integer of at least one.

5. A process as in claim 1 wherein the N-(aminoalkyl) piperazine contains no more than 18 carbon atoms, the alkyl group in the aminoalkyl portion having no more than 6 carbon atoms.

6. A process as in claim 1 wherein the imidazole compound is used in the form of its salt, said salt being selected from the group consisting of acetate, benzoate, formate, phosphate, lactate and tartrate.

7. A process as in claim 1 wherein the reaction is carried out in the presence of an organic diluent.

8. A process for curing a polyepoxide having more than one vic-epoxy group at temperatures up to about room temperature which comprises contacting the polyepoxide with a curing amount of a curing agent combination comprising (a) 25-40% by weight of an aliphatic polyamine of the formula

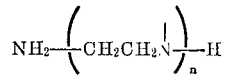

wherein $n$ is an integer varying from 2-8, (b) 20-30% by weight of an N-(aminoalkyl)piperazine (c) 10-20% by weight of dicyandiamide, and (d) 25-35% by weight of an imidazole compound of the formula

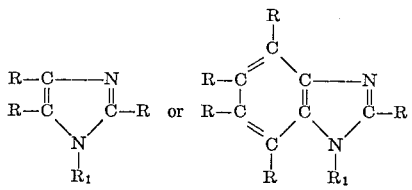

wherein R and $R_1$ are hydrogen, said percent by weight being calculated on the total weight of said curing agent.

9. A room-temperature stable curing agent combination suitable for curing epoxy resins at room temperatures and below comprising (a) 25-40% by weight of an aliphatic polyamine possessing a plurality of aminohydrogens, (b) 20-30% by weight of N-(aminoalkyl)piperazine, and (c) 25-35% by weight of an imidazole compound of the formula

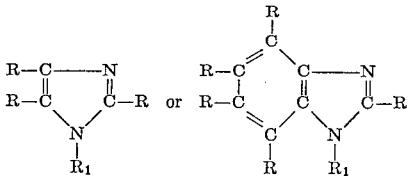

wherein R is hydrogen, halogen or a hydrocarbon radical, and $R_1$ is hydrogen or a hydrocarbon radical, and (d) 10-20% by weight of dicyandiamide, said percent by weight being calculated on the total weight of said curing agent.

References Cited

UNITED STATES PATENTS

| 2,965,609 | 12/1960 | Newey | 260—47EpCN |
| 3,438,937 | 4/1969 | Christie | 260—47EpCN |
| 3,356,645 | 12/1967 | Warren | 260—47EpCN |

FOREIGN PATENTS

| 1,084,667 | 9/1967 | Great Britain | 260—47 |

WILLIAM H. SHORT, Primary Examiner

T. E. PERTILLA, Assistant Examiner

U.S. Cl. X.R.

252—182; 260—2, 18, 29.1, 75, 78.4, 830